March 17, 1931. L. WETMORE ET AL 1,797,183
SOAPSTONING DEVICE
Filed April 27, 1928 2 Sheets-Sheet 1

Inventor
Laurence Wetmore
Herbert E. Riggs

Patented Mar. 17, 1931

1,797,183

UNITED STATES PATENT OFFICE

LAURENCE WETMORE, OF ALAMEDA, CALIFORNIA, AND HERBERT E. RIGGS, OF AKRON, OHIO, ASSIGNORS TO THE GOODYEAR TIRE & RUBBER COMPANY, OF AKRON, OHIO, A CORPORATION OF OHIO

SOAPSTONING DEVICE

Application filed April 27, 1928. Serial No. 273,355.

This invention relates, generally, to apparatus for coating adhesive surfaces with antifriction material, and it has particular relation to an apparatus of the above designated character for coating the interior surface of rubber tubing which is formed by an extruding machine.

This embodiment of the invention comprises an apparatus having a screw conveyor for transporting small quantities of powdered soapstone from a container operatively associated therewith, and discharging the soapstone into an injector where it is suspended in a blast of air and discharged through an extruding core into the interior of a tube formed continuously by an extruding machine. The quantity of soapstone which is supplied by the injector is controlled by varying the rate of rotation of the screw conveyor.

For a better understanding of the invention, reference may now be had to the accompanying drawings, forming a part of this specification, of which:

Fig. 3 is a cross-sectional view of an injector embodied in the soapstoning device, taken substantially on line III—III of Fig. 2.

Figure 1:
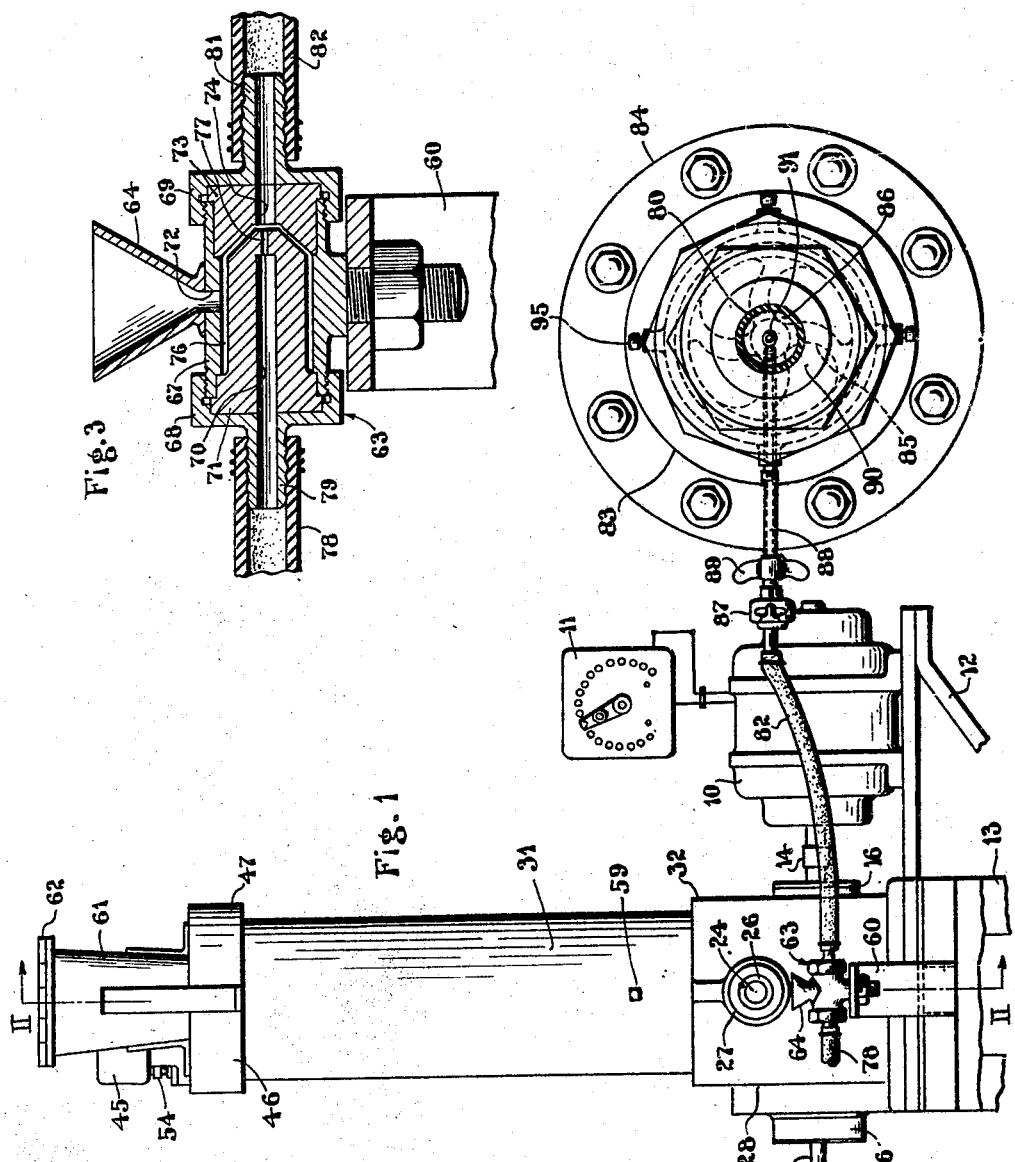
Fig. 1 is a fragmentary end elevational view of an extruding machine having a soapstoning device embodying one form of the invention, associated operatively therewith.
Figure 2:
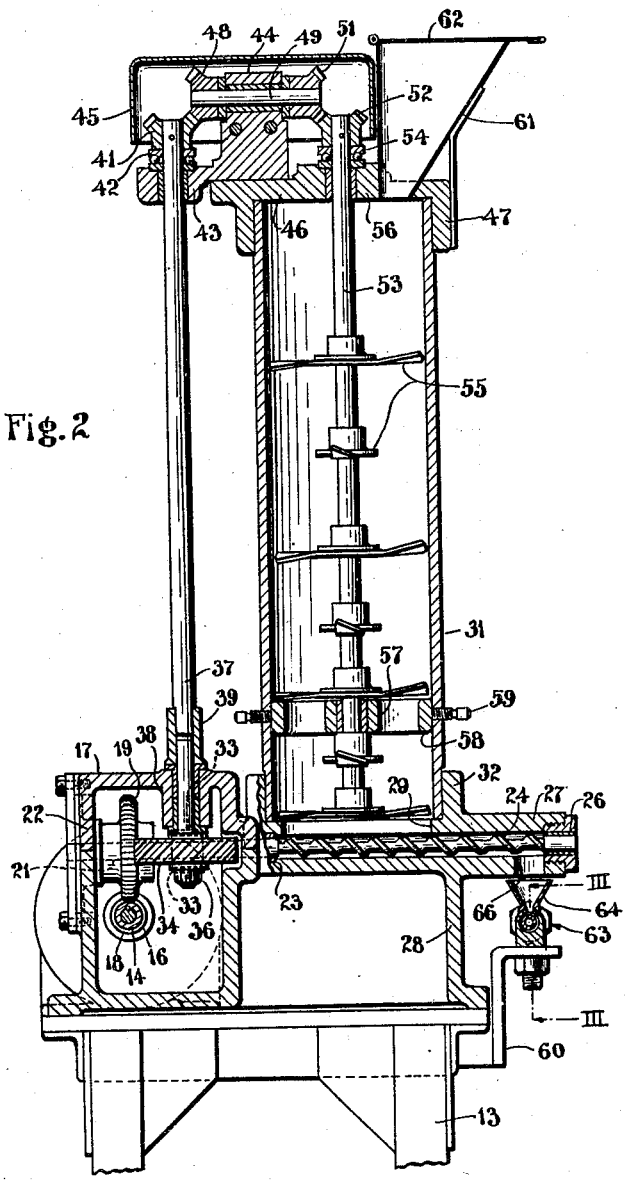
Fig. 2 is a cross-sectional view of the soapstoning device, taken substantially on line II—II of Fig. 1.

In practicing the invention, a motor 10, having a rheostat 11 for controlling the speed thereof, is supported rigidly upon a bracket 12 which projects from one side of a frame 13. A shaft 14 of the motor 10 is rotatably supported at one end portion thereof remote from the motor in bearing 16 which is formed in the walls of a gear casing 17. A worm 18, rigidly secured on an end of the shaft 14 projecting into the interior of the gear casing 17, operatively engages a worm wheel 19, which is rigidly secured on an intermediate portion of a shaft 21. Bearings 22 and 23, formed in the casing 17, rotatably support the shaft 21 in a horizontal plane substantially above the axis of the shaft 14.

A screw conveyor 24, formed on an end of the shaft 21 beyond the bearing 23, is journaled at its opposite end in a bearing 26 which is screw-threaded into the end of a tubular portion 27 of a base section 28, projecting from and formed integral with the gear casing 17. The latter and the base section 28 are secured rigidly to an upper portion of the frame 13. An opening 29, formed in an upper portion of the tubular portion 27, communicates with the interior of a vertically disposed casing or container 31, the lower end of which is surrounded by a flange 32 formed on an upper portion of the base section 28.

A small spiral pinion 33, rigidly mounted on the shaft 21 adjacent the gear 19, operatively engages a spiral gear 34 which is secured by a nut 36, on the lower end of a vertically disposed shaft 37. A bearing 38, formed in an upper surface of the gear casing 17, rotatably supports the shaft 37 adjacent the spiral gear 34. The bearing is abutted at its upper end by a thrust ring 39 which is secured rigidly on the shaft 37 above the bearing. A small beveled gear 41, rigidly secured upon the upper end of the shaft 37, rests upon a thrust bearing 42, surrounding the shaft 37, which is supported by a bracket 43 that projects from a lower portion of a bearing block 44. A head 46, to which the block 44 is rigidly secured, has a flange 47 within which an upper portion of the casing 31 is secured.

A beveled gear 48, operatively engaged by the beveled gear 41, is secured rigidly at one end of a short shaft 49, which is mounted rotatably in the bearing block 44. A beveled gear 51, rigidly secured on the opposite end of the shaft 49, meshes with a beveled gear 52, which is mounted rigidly on an upper end portion of a vertically disposed shaft 53. A thrust bearing 54, inserted between the lower end of the gear 52 and the upper end of a bearing block 56, which is formed centrally within the head 46, rotatably support the upper end of the shaft 53 within the casing 31. A shell 45, surrounding the gear mechanism above the head 46 and secured thereto, insures the safe operation of the mechanism. The lower end of the shaft 53 is journaled in a bearing portion 57 of a spider 58 that is secured rigidly within the casing 31 by set screws 59. Stirring devices 55 are rigidly secured in spaced relation upon the shaft 53 within the casing 31. An inverted frusto-conical hopper 61, provided with a hinged closure 62 at an upper end thereof, is secured in an opening formed in the head 46.

A funnel-shape feeding hopper 64 of an injector 63 is positioned directly beneath an opening 66 that is formed in a lower portion of the tubular member 27 adjacent the end thereof remote from the opening 29. The injector 63 is supported by a bracket 60 which is secured rigidly to an upper side portion of the frame 13. A casing 67 of the injector 63, supporting the funnel-shape hopper 64, is screw-threaded at opposite ends for receiving internally threaded flanged couplings 68 and 69. An opening 72, formed in the casing 67, provides communication between the interior of the latter and the funnel-shape hopper 64. A venturi 71, having a centrally disposed aperture 70 formed therein, is rigidly secured in the interior of the tubular member 67, between an end thereof and the flanged coupling 68. A block 73 having a centrally disposed aperture 74, which communicates with a space 76 between the Venturi member 71 and the tubular member 67, is likewise rigidly secured between the end of the latter and the coupling 69. A throat 77 of the Venturi member 71 is adapted to discharge a blast of air under pressure from the aperture 70 into the aperture 74.

A conduit 78, communicating with a compressed air pump (not shown), is connected to a tubular projecting portion 79 of the coupling 68, through which the air under pressure is supplied to the interior aperture 70 of the Venturi member 71.

A tubular portion 81, of the coupling 69, which communicates with the aperture 74, is connected to one end of a conduit 82, the opposite end of which extends through on opening formed in a casing 83 of an extruding machine 84. The end of the conduit 82 is screw-threaded into an opening formed in a core 86 which is disposed centrally within the casing 83. The core 86 is supported axially within the casing 83 by a spider 85 which is secured rigidly to the latter. A rubber tube 80 is extruded continuously by the machine 84 between the core 86 and a die 90 which is secured by set screws 95 to the casing 83.

A bayonet slot coupling 87, inserted intermediate the opposite ends of the conduit 82, provides means for disconnecting one portion of the conduit from the other. A section 88 of the conduit 82, which projects within the casing 83 of the extruding machine 84, is provided with a wing nut 89, rigidly secured thereto, for its convenient manipulation. The opposite end of the section 88 communicates with an opening 91, which is disposed axially within the core 86 and communicates with the space beyond the front surface of the latter.

In the operation of the apparatus, the casing 31 is filled with powdered soapstone or other suitable anti-friction material through the hopper 61. The stirring devices 55, which are rotated by the shaft 53 within the soapstone contained in the casing 31, prevent solidification of the soapstone and facilitate its discharge through the opening 29 upon the slowly rotating screw conveyor 24. Small quantities of the anti-friction material thus are discharged through the opening 66 into the funnel-shaped member 64.

The action of the injector 63 causes the soapstone to be drawn through the opening 72 and co-mingled with or suspended in the blast of air discharged from the throat 77 of the Venturi member 71. The suspended soapstone is transported through the conduit 82 and is discharged beyond the front surface of the core 86 into the interior of the tubing 80 which is formed by the extruding machine 84. By manipulating the rheostat 11, the speed of the motor 10 and consequently the speed of the screw 24 is varied at will. Thus, owing to the variation of the speed of the screw 24, any desired quantity of soapstone may be discharged through the opening 66 into the injector 63. Accordingly, the quantity of soapstone, suspended in the blast of air which is discharged through the core 86, is varied to a nicety.

From the foregoing description, it is apparent that the invention embodies a very economical apparatus for supplying anti-friction material to the interior of rubber tubing formed by an extruding machine. Since the soapstone is supplied in variable quantities, depending on the size and character of the tubing, a relatively great saving, in the total amount of soapstone employed over extended periods of time, is made possible.

Although we have illustrated only one form which the invention may assume, and have described in detail but a single application thereof, it will be apparent to those skilled in the art that the invention is not so limited but that various minor modifications may be made therein without departing from the spirit of the invention or from the scope of the appended claim.

What we claim is:

In combination, a machine for extruding plastic tubing comprising a casing, a die for the formation of tubes mounted in the casing, a core for the formation of the hollow passage in tubes disposed within the opening of the die, a passage formed within the core and having a conduit connected thereto, means for forcing a blast of air through the conduit, means for positively feeding powdered materials to the conduit comprising a hopper, a screw conveyor discharging into the hopper, a vertical container for powdered material disposed above the screw conveyor, an individual motor geared to the conveyor for imparting rotational movement thereto, and a rheostat disposed in the circuit of the motor for controlling the speed of rotation of the latter.

In witness whereof, we have hereunto signed our names.

LAURENCE WETMORE.
HERBERT E. RIGGS.